(12) United States Patent
Wang et al.

(10) Patent No.: US 7,245,658 B2
(45) Date of Patent: *Jul. 17, 2007

(54) READ CHANNEL APPARATUS FOR AN OPTICAL STORAGE SYSTEM

(75) Inventors: Tzu-Pai Wang, Taipei (TW); Meng-Ta Yang, Miaoli Hsien (TW); Pi-Hai Liu, Taipei (TW)

(73) Assignee: Mediatek, Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/352,574

(22) Filed: Feb. 13, 2006

(65) Prior Publication Data

US 2006/0133255 A1  Jun. 22, 2006

Related U.S. Application Data

(63) Continuation-in-part of application No. 11/126,991, filed on May 11, 2005, which is a continuation of application No. 09/947,169, filed on Sep. 5, 2001, now Pat. No. 6,904,084.

(51) Int. Cl.
  *H03H 7/40* (2006.01)
(52) U.S. Cl. ............ 375/229; 375/340; 375/350; 375/355; 369/47.18; 369/47.29; 369/17.35; 369/59.22
(58) Field of Classification Search ........ 375/229, 375/262, 324, 340, 341, 350, 344, 355; 369/47.15, 369/47.18, 47.28, 47.29, 47.35, 59.21, 59.22; 360/65
See application file for complete search history.

(56) References Cited

U.S. PATENT DOCUMENTS 5,400,364 A  3/1995  Yada ................... 375/327
5,724,396 A *  3/1998  Claydon et al. .......... 375/355
5,802,118 A  9/1998  Bliss et al. ............. 375/350
5,966,415 A * 10/1999  Bliss et al. ............. 375/350
6,055,119 A *  4/2000  Lee ..................... 360/51
6,418,101 B1  7/2002  Finkelstein ........... 369/47.18
6,674,707 B2  1/2004  Ogura et al. ......... 369/59.22
6,879,623 B2 *  4/2005  Agami et al. ............ 375/140

FOREIGN PATENT DOCUMENTS

TW       466833        12/2001

OTHER PUBLICATIONS

Gardener, Floyd, IEEE Transactions on Communications, vol. 41, No. 3, Mar. 1993, 501-507.
Erup, Lars, IEEE Transactions on Communications, vol. 41, No. 6, Jun. 1993, 998-1008.

* cited by examiner

*Primary Examiner*—Dac V. Ha
(74) *Attorney, Agent, or Firm*—Thomas, Kayden, Horstemeyer & Risley

(57) ABSTRACT

A read channel apparatus is disclosed for reading data recorded on an optical storage system. An exemplary sampling device samples an analog read signal generating from the optical storage system to generate a sequence of sample values. A subtractor subtracts an estimated DC offset from the sample values to generate a sequence of DC-removed sample values. An equalizer equalizes DC-removed sample values in accordance with a target spectrum to generate a sequence of equalized sample values. First and second interpolators interpolate the equalized sample values to respectively generate sequences of even-time sample values and odd-time sample values. A data sequence composed of the even-time and the odd-time sample values is substantially synchronized to the baud rate. A timing recovery controller controls the interpolators to synchronize the even-time and odd-time sample values to the baud rate.

22 Claims, 6 Drawing Sheets

READ CHANNEL APPARATUS FOR AN OPTICAL STORAGE SYSTEM

CROSS REFERENCE TO RELATED APPLICATIONS

This application is a Continuation-In-Part of pending U.S. patent application Ser. No. 11/126,991, filed May 11, 2005 and entitled "READ CHANNEL APPARATUS AND METHOD FOR AN OPTICAL STORAGE SYSTEM", which is a Continuation of prior application Ser. No. 09/947,169, filed Sep. 5, 2001 (now U.S. Pat. No. 6,904,084) and entitled "READ CHANNEL APPARATUS AND METHOD FOR AN OPTICAL STORAGE SYSTEM".

BACKGROUND OF THE INVENTION

1. Field of the Invention

The present invention relates generally to an optical storage system and, in particular, to a read channel apparatus for an optical storage system.

2. Description of the Related Art

In recent years, the development of new optical recording media and data compression techniques has made it possible to achieve enormous data storage capacity using optical storage systems. Optical storage systems are used to store audio information, such as in Compact Disk (CD) players, as well as visual and computer information, such as in CD-ROM and the more recent Digital Video Disk (DVD) players. The information is typically recorded as a binary sequence by writing a series of "pits" on the optical medium which represent binary "1" and "0" bits. When reading this recorded data, a pick-up head (transducer), positioned in close proximity to the rotating disk, detects the alternations on the medium and generates an analog read signal. The analog read signal is then detected and decoded by read channel circuitry to reproduce the recorded data.

To improve performance of the read channel in an optical storage system, the sampled amplitude techniques are applied. Sampled amplitude read channels commonly employ an analog-to-digital converter (ADC) and a digital read channel processor to reproduce data recorded on the optical storage systems. However, in high-speed optical storage systems, the baud rate (channel bit rate) is very high such that sampling frequency of ADC and clock of digital processor also need comparable high clock rate sources. This is not desirable since operating the channel at higher frequencies increases its complexity and cost. There is, therefore, a need for a sampled amplitude read channel for use in storage systems that can operate at high data rates and densities without increasing the cost and complexity of the read channel ICs. To this end, U.S. Pat. No. 5,802,118 (Bliss et al.) discloses a sub-sampled discrete time read channel for magnetic disk storage systems. According to this patent, the read channel sub-samples an analog signal at a rate less than or equal to $9/10$ the baud rate. K. C. Huang, the inventor of present invention, discloses a sub-sampled method for read channel of an optical storage system in Taiwan patent application No. 089,110,848, filed in June 2000. The prior art sub-samples an analog signal at a rate slightly above $\frac{1}{2}$ the baud rate. The sub-sampled values are down-sampled by a timing recovery interpolator to generate sample values synchronized to one-half the baud rate. The synchronous sample values are then equalized by a 2T-spaced equalizer and interpolated by a factor-two upsampler. Although it significantly reduces the sampling frequency, the latency time introduced by the upsampler causes significant degradation in the performance of the high-speed optical storage systems.

For the reasons mentioned above, a novel read channel apparatus and method is provided to reproduce data recorded on the optical storage systems, unencumbered by the limitations associated with the prior art.

BRIEF SUMMARY OF INVENTION

A detailed description is given in the following embodiments with reference to the accompanying drawings.

An exemplary embodiment of a read channel apparatus for reading data recorded on an optical storage system at a predetermined baud rate comprises a sampling device, a subtractor, an equalizer, first and second interpolators, a timing recovery controller, and a DC offset estimator. The sampling device asynchronously samples an analog read signal generating from the optical storage system to generate a sequence of asynchronous sample values. The subtractor subtracts an estimated DC offset from the asynchronous sample values to generate a sequence of asynchronous DC-removed sample values. The equalizer equalizes asynchronous DC-removed sample values in accordance with a target spectrum to generate a sequence of equalized sample values. The first interpolator interpolates the equalized sample values to generate a sequence of synchronous even-time sample values. The second interpolator interpolates the equalized sample values to generate a sequence of synchronous odd-time sample values. A data sequence composed of the even-time sample values and the odd-time sample values is substantially synchronized to the baud rate. The timing recovery controller, responsive to the even-time sample values and the odd-time sample values, controls the first interpolator and the second interpolator respectively in order to synchronize the even-time and odd-time sample values to the baud rate. The DC offset estimator generates the estimated DC offset from the even-time sample values and the odd-time sample values.

Some exemplary embodiments of a read channel apparatus for reading data recorded on an optical storage system at a predetermined baud rate comprise a sampling device, a subtractor, a first interpolator, a timing recovery controller, and an DC offset estimator. The sampling device samples an analog read signal generating from the optical storage system according to a sampling clock to generate a sequence of sample values. The subtractor subtracts an estimated DC offset from the sample values to generate a sequence of DC-removed sample values. The first interpolator interpolates the DC-removed sample values to generate a sequence of first interpolated sample values. The timing recovery controller, responsive to the DC-removed sample values and the first interpolated sample values, controls the sampling clock in order to synchronize in phase with the data recorded on the optical storage system. The DC offset estimator generates the estimated DC offset from the DC-removed sample values and the first interpolated sample values. In some embodiments, the read channel apparatus further comprises an equalizer for equalizing the DC-removed sample values in accordance with a target spectrum, and the output of the equalizer is provided to the first interpolator, wherein the sampling rate of the sampling clock may equal to the predetermined baud rate or $\frac{1}{2}$ the baud rate. In some other embodiments, the read channel apparatus may further comprise a plurality of interpolators interpolating the output of the equalizer. As a result, the recorded data may be recovered when a sampling rate lower than ½ the baud rate is used.

Some embodiments of a read channel apparatus for reading data recorded on an optical storage system at a predetermined baud rate comprise a sampling device, a subtractor, N equalizers, (N−1) interpolators, a timing recovery controller, and a DC offset estimator. The sampling device samples an analog read signal generating from the optical storage system according to a sampling clock to generate a sequence of sample values. The subtractor subtracts an estimated DC offset from the sample values to generate a sequence of DC-removed sample values. The (N−1) interpolators interpolate the DC-removed sample values to generate (N−1) sequences of interpolated sample values. The 1st equalizer among the N equalizers equalizes the DC-removed sample values to generate a 1st sequence of equalized sample values. The 2nd to Nth equalizers among the N equalizers equalize the (N−1) sequences of interpolated sample values to generate 2nd to Nth sequences of equalized sample values. A data sequence composed of the 1st to Nth sequences of equalized sample values is substantially synchronized to the baud rate. The timing recovery controller, responsive to the 1st to Nth sequences of equalized sample values, controls the sampling clock in order to synchronize in phase with the data recorded on the optical storage system. The DC offset estimator generates the estimated DC offset from the 1st to Nth sequences of equalized sample values.

An exemplary embodiment of a read channel apparatus for reading data recorded on an optical storage system at a predetermined baud rate comprises a sampling device, N equalizers, and a timing recovery controller. The sampling device samples an analog read signal generating from the optical storage system according to a sampling clock to generate a sequence of sample values. The N equalizers equalize the sample values in accordance with a target spectrum to generate N sequences of equalized sample values. The timing recovery controller, responsive to the N sequences of equalized sample values, controls the sampling clock in order to synchronize in phase with the data recorded on the optical storage system.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
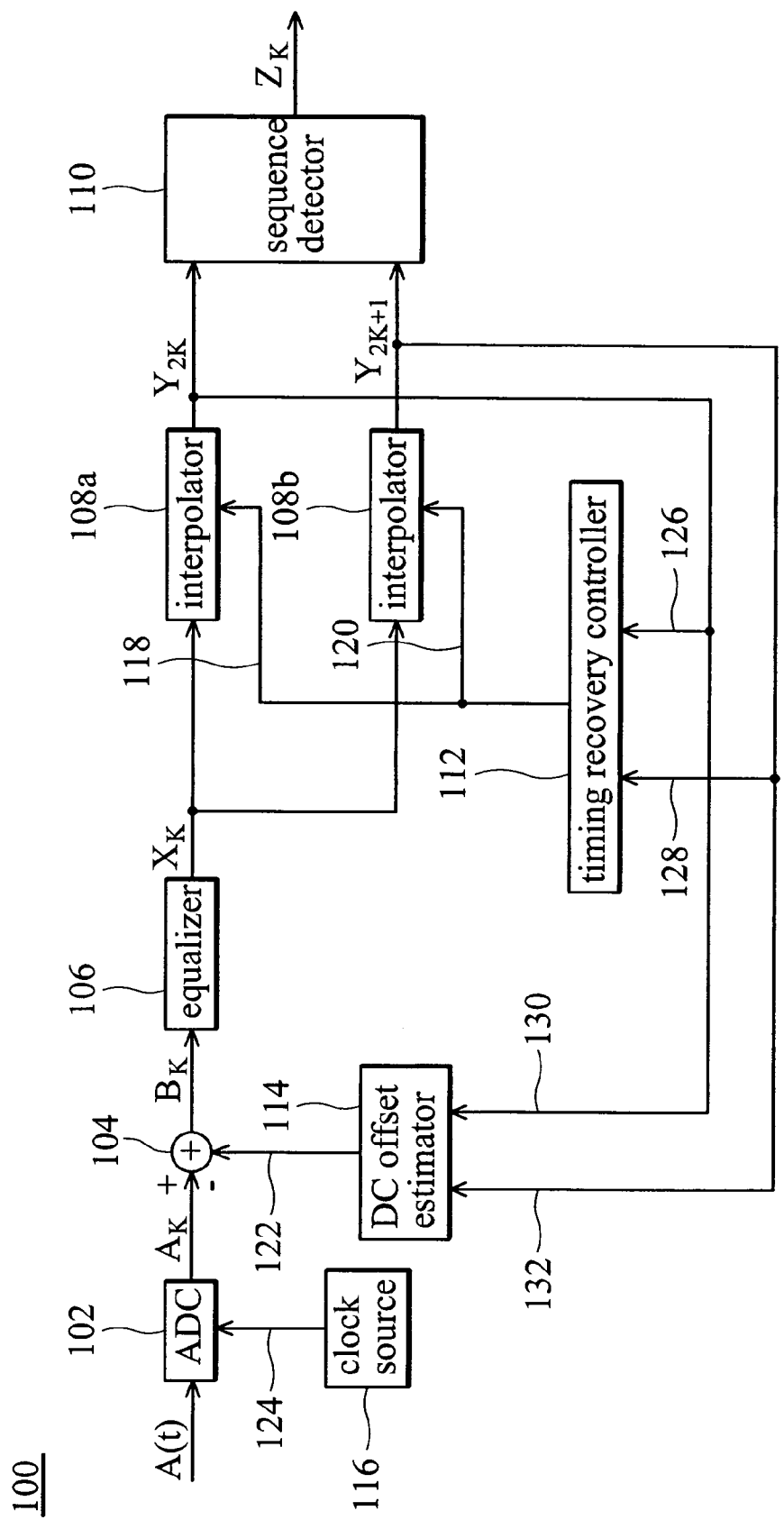
FIG. 1 shows an embodiment of a read channel apparatus.

In an exemplary embodiment of a read channel apparatus 100 as shown in FIG. 1, the apparatus 100 reads data recorded on an optical storage system at a predetermined baud rate, and comprises a sampling device 102 (e.g., an analog-to-digital converter, ADC), a subtractor 104, an equalizer 106, first and second interpolators 108a and 108b, a timing recovery controller 112, a DC offset estimator 114, and a clock source 116. An analog read signal A(t), generating from the optical storage system, is asynchronously sampled by the sampling device 102 to generate a sequence of asynchronous sample values $A_K$. The sampling device 102 is clocked at a constant frequency fs by a sampling clock 124 generated by a clock source 116. The subtractor 104 subtracts an estimated DC offset 122 from the asynchronous sample values $A_K$ to generate a sequence of asynchronous DC-removed sample values $B_K$. The equalizer 106 equalizes the asynchronous DC-removed sample values $B_K$ in accordance with a target spectrum to generate a sequence of equalized sample values $X_K$. The equalized sample values $X_K$ are transmitted to the first and second interpolators 108a and 108b. The first interpolator 108a interpolates the equalized sample values $X_K$ and generates a sequence of synchronous even-time sample values $Y_{2K}$ substantially synchronized to one-half the baud rate. The second interpolator 108b also interpolates the equalized sample values $X_K$ and generates a sequence of synchronous odd-time sample values $Y_{2K+1}$ substantially synchronized to one-half the baud rate.

The even-time and odd-time sample sequences $Y_{2K}$ and $Y_{2K+1}$ are fed back to the timing recovery controller 112 and the DC offset estimator 114. The timing recovery controller 112 respectively controls the first interpolator 108a and the second interpolator 108b, in response to $Y_{2K}$ and $Y_{2K+1}$ received over lines 126 and 128, to synchronize the even-time and odd-time sample values to the baud rate. An embodiment of the timing recovery controller is a phase lock loop (PLL). The DC offset estimator 114, in response to $Y_{2K}$ and $Y_{2K+1}$ received over lines 130 and 132, generates the estimated DC offset 122.

In the embodiment of FIG. 1, if the quality (e.g., signal-to-noise ratio) of the analog read signal A(t) is good enough, an estimated binary sequence $Z_K$ representing recorded data can be determined directly from a data sequence $Y_K$ composed of $Y_{2K}$ and $Y_{2K+1}$ as $Y_K$ is substantially synchronized to the baud rate. However, if the quality of the analog read signal A(t) is poor, a sequence detector 110 is preferably applied to detect the sequence $Z_K$ from $Y_{2K}$ and $Y_{2K+1}$. The sequence detector 110 typically utilizes the Viterbi algorithm to check the run length limitation of DVD systems. In DVD, the minimum run length is 3, that is, the sequence with ". . . 0001000 . . . ", ". . . 00011000 . . . ", ". . . 1110111 . . . ", and ". . . 11100111 . . . " are not allowed and will be corrected by the sequence detector 110. The read channel apparatus 100 as described above processes the even-time and odd-time sample values separately so that it avoids degrading in performance caused by an up-sampling latency.

Figure 2A:
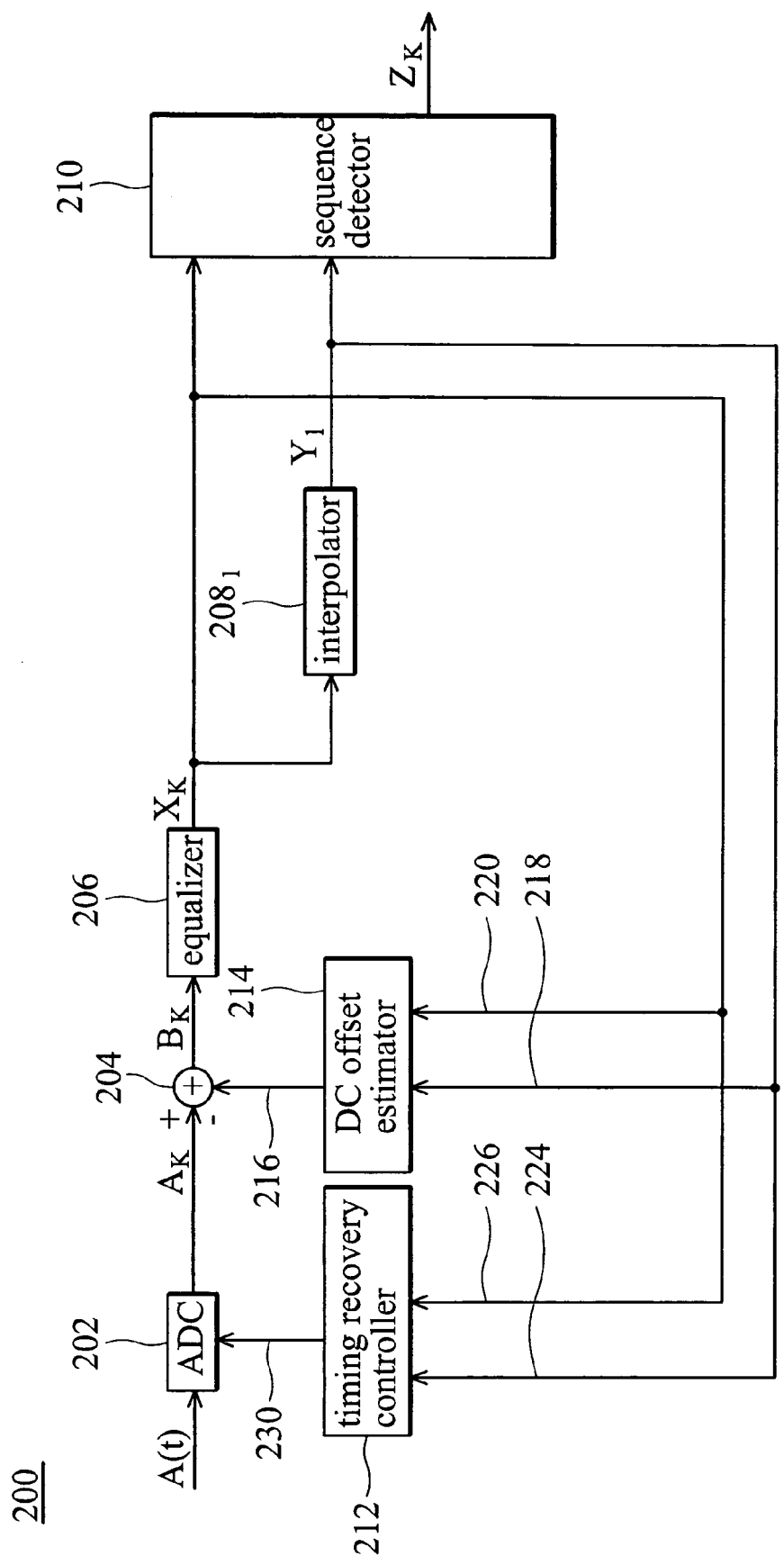
FIGS. 2A and 2B show an embodiment of a read channel apparatus comprising (N−1) interpolators.
Figure 2B:
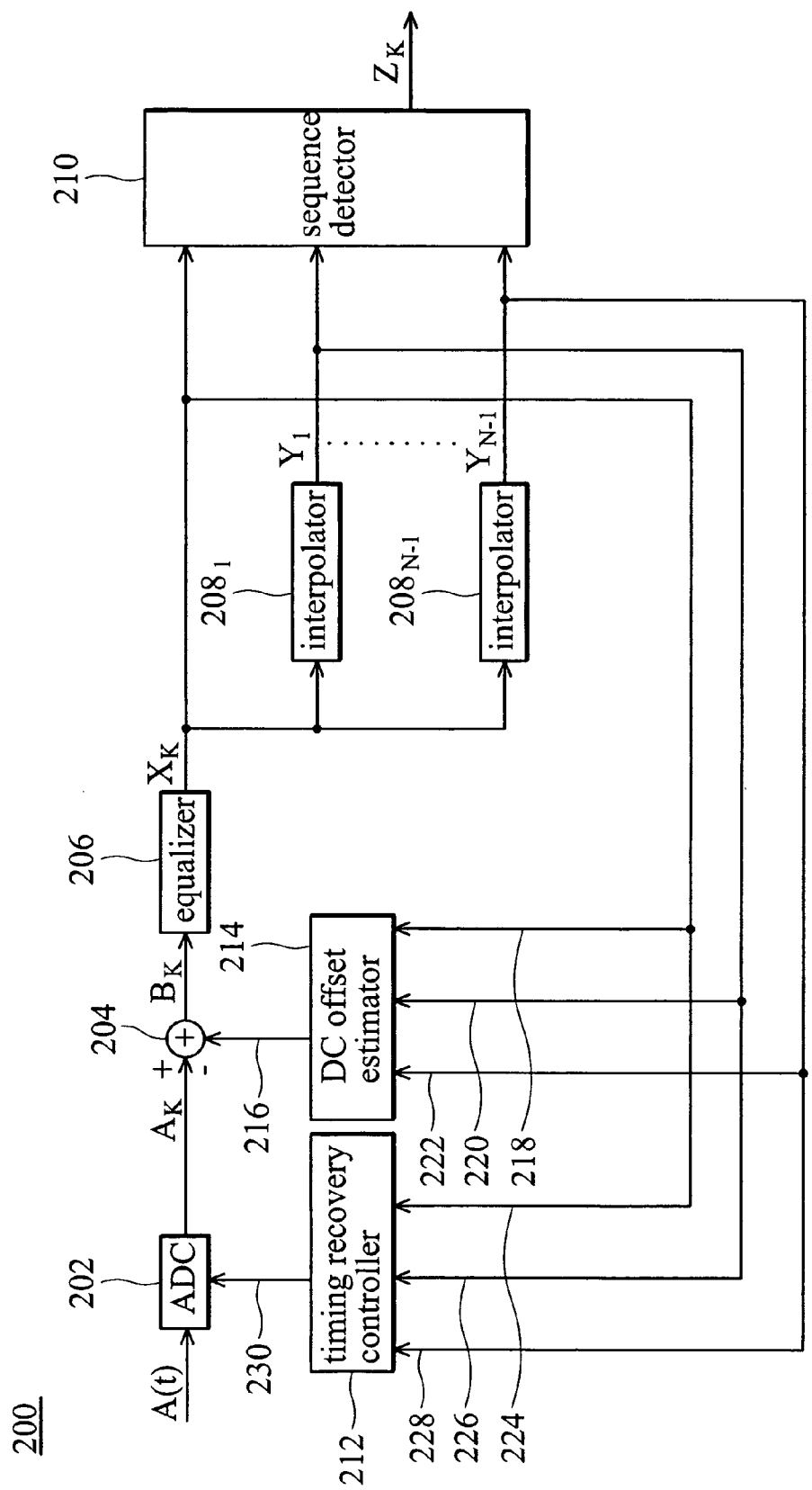

In an exemplary embodiment of a read channel apparatus 200 as shown in FIGS. 2A and 2B, the apparatus 200 reads data recorded on an optical storage system at a predetermined baud rate, and comprises a sampling device 202 (e.g. ADC), a subtractor 204, an equalizer 206, at least one interpolator 208, a timing recovery controller 212, and a DC offset estimator 214. According to embodiments of FIG. 2B, N−1 interpolators 208 are required when N paths are feedback to the timing recovery controller 212. In an embodiment of FIG. 2A, only one interpolator $208_1$ is required when there are two paths feedback to the timing recovery controller 212, and a data sequence composed of two sequences of sample values $X_K$ and $Y_1$ is substantially synchronized to the baud rate. In an embodiment of FIG. 2B, N−1 interpolators $208_1$ to $208_{N-1}$ are required when there are N feedback paths, and a data sequence of sample values $X_K$, or any of $Y_1$ to $Y_{N-1}$ is substantially synchronized to 1/N the baud rate. In the following description, the apparatus 200 of FIG. 2A is given as an example. An analog read signal A(t), generating from the optical storage system, is sampled by the sampling device 202 to generate a sequence of sample values $A_K$. The sampling device 202 is clocked by a sampling clock 230 generated by the timing recovery controller 212. The subtractor 204 subtracts an estimated DC offset 216 from the sample values $A_K$ to generate a sequence of DC-removed sample values $B_K$. The equalizer 206 equalizes the DC-removed sample values $B_K$ in accordance with a target spectrum to generate a sequence of equalized sample values $X_K$. The equalized sample values $X_K$ are transmitted to the interpolator $208_1$. In the embodiment shown in FIG. 2B, the equalized sample values $X_K$ are transmitted to the interpolators $208_1$ to $208_{N-1}$ in order to generate sequences of interpolated sample values $Y_1$ to $Y_{N-1}$ respectively.

The equalized sample values $X_K$ and the interpolated sample values $Y_1$ or $Y_1$ to $Y_{N-1}$ are fed back to the timing recovery controller 212 and the DC offset estimator 214. The timing recovery controller 212 generates the sampling clock 230, in response to the sample values received from the equalizer 206 and the interpolators 208, to synchronize in phase with the data recorded on the optical storage system. The DC offset estimator 214, in response to the sample values received from the equalizer 206 and the interpolators 208, generates the estimated DC offset 216.

In the embodiment of FIGS. 2A and 2B, if the quality of the analog read signal A(t) is good enough, an estimated binary sequence $Z_K$ representing recorded data can be determined directly from a data sequence $Y_K$ composed of $X_K$ and $Y_1$ in the embodiment of FIG. 2A, or $X_K$ and $Y_1$ to $Y_{N-1}$ in the embodiment of FIG. 2B, and the data sequence $Y_K$ is substantially synchronized to the baud rate. However, if the quality of the analog read signal A(t) is poor, the data sequence $Y_K$ is further transmitted to a sequence detector 210 to detect the sequence $Z_K$. The sequence detector 210 typically utilizes the Viterbi algorithm to check the run length limitation of DVD systems.

Figure 3:
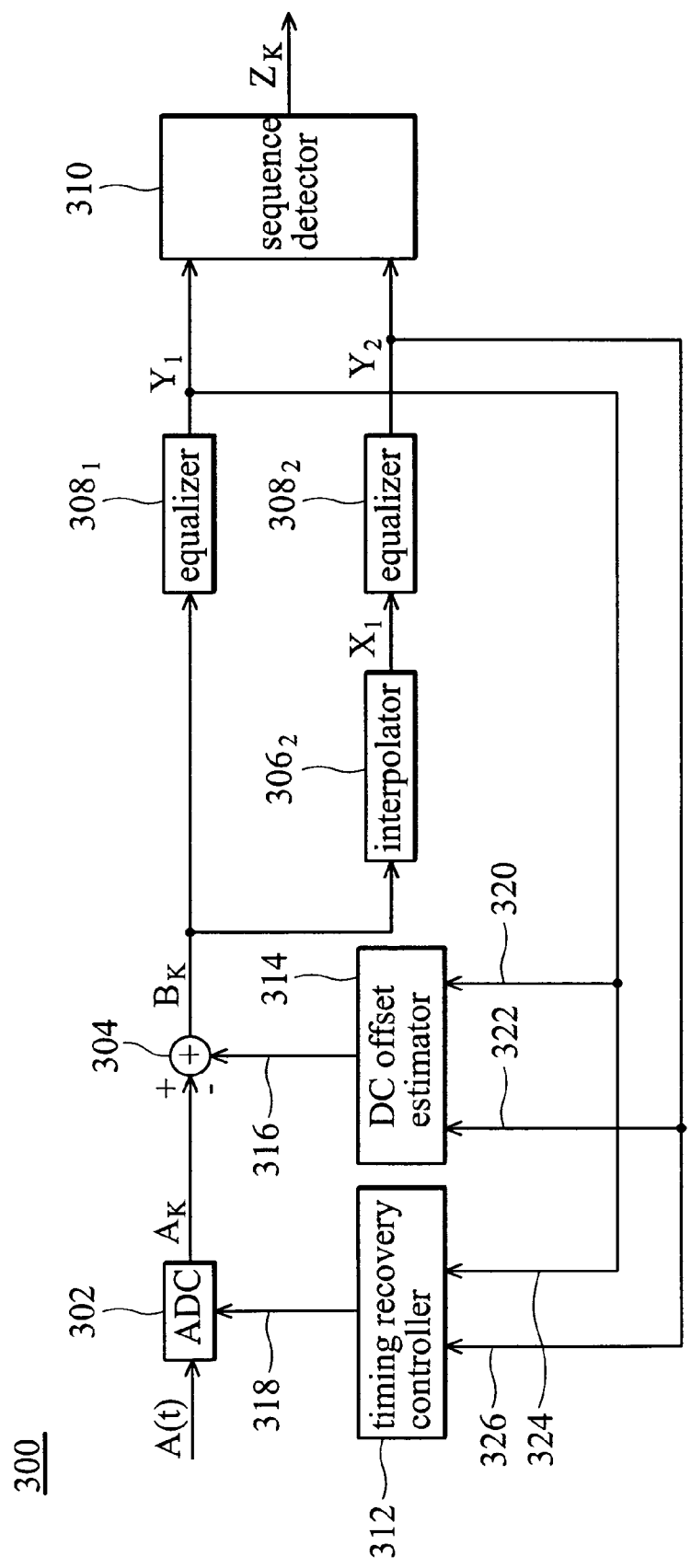
FIGS. 3 and 4 show embodiments of a read channel apparatus comprising (N−1) interpolators and N equalizers.

In an exemplary embodiment as shown in FIG. 3, a read channel apparatus 300 reads data recorded on an optical storage system at a predetermined baud rate, and comprises a sampling device 302 (e.g. ADC), a subtractor 304, an interpolator $306_2$, two equalizers $308_1$ and $308_2$, a timing recovery controller 312, and a DC offset estimator 314. An analog read signal A(t), generating from the optical storage system, is sampled by the sampling device 302 to generate a sequence of sample values $A_K$. The sampling device 302 is clocked at a frequency fs by a sampling clock 318 generated by the timing recovery controller 312. The subtractor 304 subtracts an estimated DC offset 316 from the sample values $A_K$ to generate a sequence of DC-removed sample values $B_K$. The DC-removed sample values $B_K$ are transmitted to the equalizer $308_1$ and the interpolator $306_2$. The interpolator $306_2$ interpolates the DC-removed sample values $B_K$ and generates a sequence of interpolated sample values $X_1$. The first equalizer $308_1$ directly equalizes the DC-removed sample values $B_K$ in accordance with a target spectrum to generate a sequence of first equalized sample values $Y_1$. The second equalizer $308_2$ equalizes the interpolated sample values $X_1$ in accordance with the target spectrum to generate a sequence of second equalized sample values $Y_2$. A data sequence $Y_K$ composed of the two sequences $Y_1$ and $Y_2$ is substantially synchronous to the predetermined baud rate.

The sequences of first and second equalized sample values $Y_1$ and $Y_2$ are fed back to the timing recovery controller 312 and the DC offset estimator 314. The timing recovery controller 312 generates the sampling clock 318, in response to $Y_1$ and $Y_2$ received over lines 324 and 326, to synchronize in phase with the data recorded on the optical storage system. The DC offset estimator 314, in response to $Y_1$ and $Y_2$ received over lines 320 and 322, generates the estimated DC offset.

In the embodiment of FIG. 3, if the quality of the analog read signal A(t) is good enough, an estimated binary sequence $Z_K$ representing recorded data can be determined directly from the data sequence $Y_K$ which is composed of $Y_1$ and $Y_2$. However, if the quality of the analog read signal A(t) is poor, the sequence detector 310 is preferably applied to detect the sequence $Z_K$ from $Y_1$ and $Y_2$. The sequence detector 310 typically utilizes the Viterbi algorithm.

Figure 4:
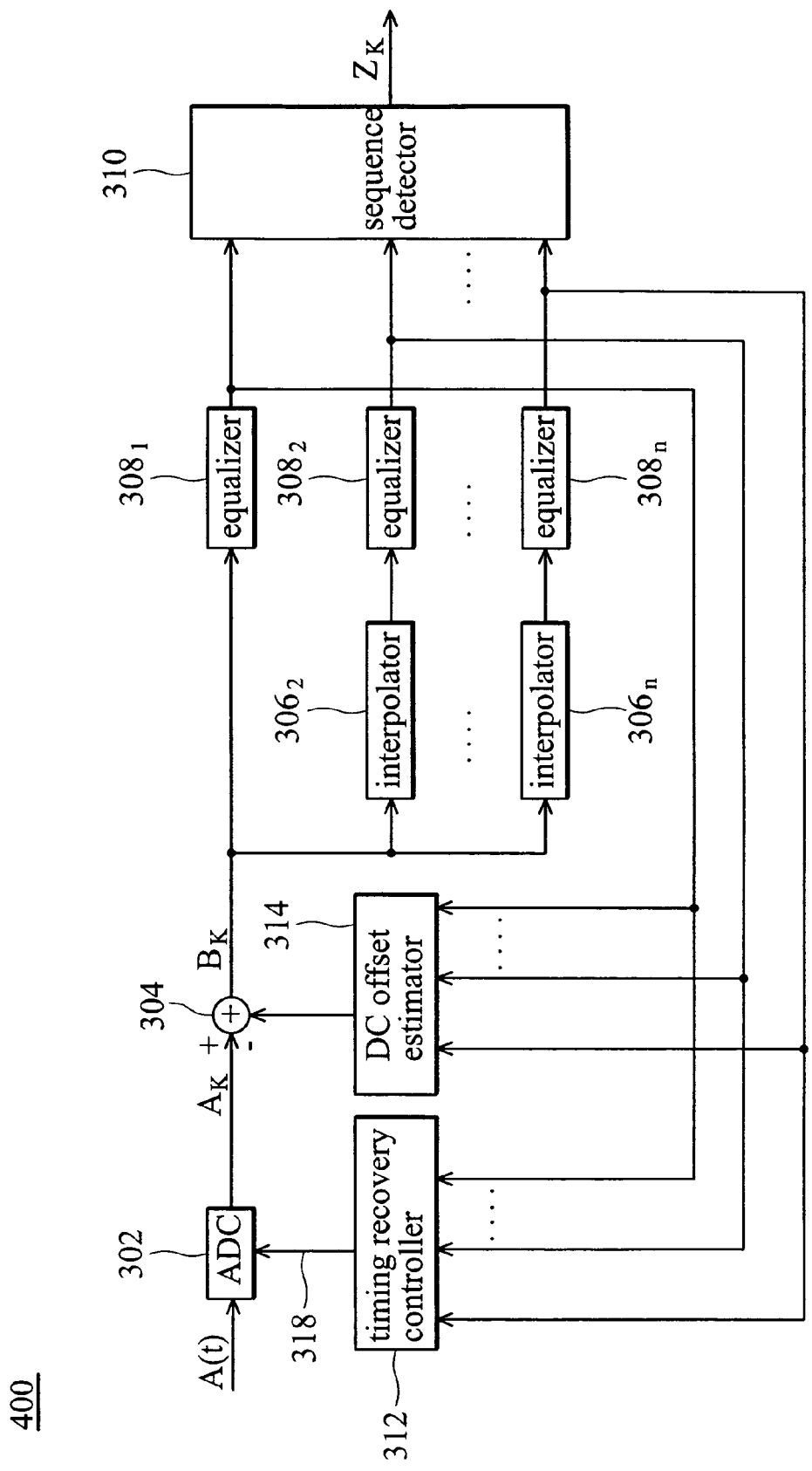

In some embodiments, as shown in FIG. 4, a read channel apparatus 400 comprises N equalizers $308_1$ to $308_n$ and (N−1) interpolators $306_2$ to $306_n$. The remaining elements in FIG. 4 perform the same operation as FIG. 3. According to the read channel apparatuses 300 and 400, when the DC-removed sample values are fed to the timing recovery controller 312 by N paths, there are N equalizers and (N−1) interpolators. Since the sequences $A_k$ and $B_k$ are regulated by the timing recovery controller 312 to synchronous in phase with the original data carried by the analog read signal A(t), an interpolator can be excluded in one of the N paths. The sampling frequency $f_s$ may be lower than the predetermined baud rate, in some embodiments, it may be selected as 1/N the baud rate.

Figure 5:
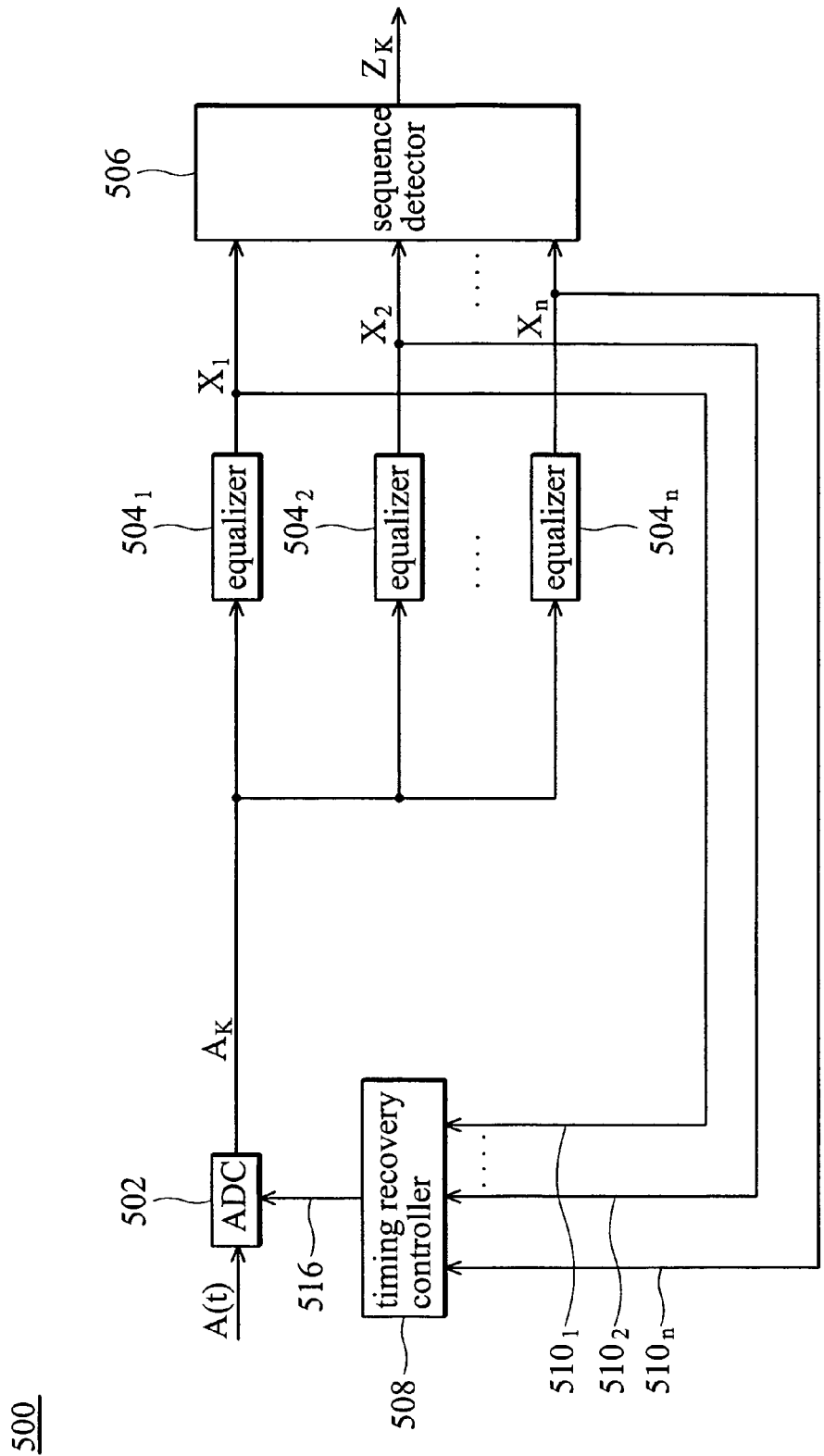
FIG. 5 shows an embodiment of a read channel apparatus comprising N equalizers.

In an exemplary embodiment as shown in FIG. 5, a read channel apparatus 500 reads data recorded on an optical storage system at a predetermined baud rate, and comprises a sampling device 502 (e.g. ADC), N equalizers $504_1$ to $504_n$, and a timing recovery controller 508. An analog read signal A(t), generating from the optical storage system, is sampled by the sampling device 502 to generate a sequence of sample values $A_K$. The sampling device 502 is clocked at a frequency fs by a sampling clock 516 generated by the timing recovery controller 508. The sample values $A_K$ are substantially synchronized in phase with the data recorded on the optical storage system, and transmitted to the equalizers $504_1$ to $504_n$. In some embodiments, the rate of the sampling clock 516 is 1/N the baud rate of A(t). The equalizers $504_1$ to $504_n$ equalize the sample values $A_K$ in accordance with a target spectrum to generate sequences $X_1$ to $X_n$ of equalized sample values. Coefficients of the equalizers may be designed to be able to generate sequences $X_1$ to $X_n$ having equivalent interpolation effects, so that interpolators are not required in this embodiment.

The read channel apparatus has the flexibility of removing the DC offset in its analog circuit section or digital circuit section. For example, in FIGS. 1 to 4, the DC offset of the input data $A_k$ is eliminated or removed in a digital end. FIG. 5 shows an embodiment in which the DC offset of the input signal may be eliminated before sampling into digital samples, so that the DC offset estimator and subtractor are not required in the read channel apparatus 500. Similarly, the DC offset estimator and subtractor are not compulsory elements for the read channel apparatuses in FIGS. 1 to 4, since the DC offset may be eliminated in the analog end.

In FIG. 5, the sequences $X_1$ to $X_n$ are fed back to the timing recovery controller 508. The timing recovery controller 508 generates the sampling clock 516, in response to sequences $X_1$ to $X_n$ received over lines $510_1$ to $510_n$, to synchronize in phase with the data recorded on the optical storage system.

In the embodiment of FIG. 5, again, the sequence detector 506 is preferably applied to detect the sequence $Z_K$ from sequences $X_1$ to $X_n$ when the signal quality is undesirable or unstable. The sequence detector 506 typically utilizes the Viterbi algorithm to construct the output data.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A read channel apparatus for reading data recorded on an optical storage system at a predetermined baud rate, comprising:
   a sampling device for asynchronously sampling an analog read signal generating from the optical storage system to generate a sequence of asynchronous sample values;
   a subtractor for subtracting an estimated DC offset from the asynchronous sample values to generate a sequence of asynchronous DC-removed sample values;
   an equalizer for equalizing the asynchronous DC-removed sample values in accordance with a target spectrum to generate a sequence of equalized sample values;
   a first interpolator for interpolating the equalized sample values to generate a sequence of synchronous even-time sample values;
   a second interpolator for interpolating the equalized sample values to generate a sequence of synchronous odd-time sample values, wherein a data sequence composed of the even-time sample values and the odd-time sample values is substantially synchronized to the baud rate;
   a timing recovery controller, responsive to the even-time sample values and the odd-time sample values, for controlling the first interpolator and the second interpolator respectively in order to synchronize the even-time and odd-time sample values to the baud rate; and
   a DC offset estimator for generating the estimated DC offset from the even-time sample values and the odd-time sample values.

2. The read channel apparatus of claim 1, further comprising a sequence detector for detecting the recorded data from the even-time sample values and the odd-time sample values.

3. The read channel apparatus of claim 2, wherein the sequence detector is a Viterbi sequence detector.

4. The read channel apparatus of claim 1, wherein the sampling device is an analog-to-digital converter.

5. A read channel apparatus for reading data recorded on an optical storage system at a predetermined baud rate, comprising:
   a sampling device for sampling an analog read signal generating from the optical storage system according to a sampling clock to generate a sequence of sample values;
   a subtractor for subtracting an estimated DC offset from the sample values to generate a sequence of DC-removed sample values;
   a first interpolator for interpolating the DC-removed sample values to generate a sequence of first interpolated sample values;
   a timing recovery controller, responsive to the DC-removed sample values and the first interpolated sample values, for controlling the sampling clock in order to synchronize in phase with the data recorded on the optical storage system ; and a DC offset estimator for generating the estimated DC offset from the DC-removed sample values and the first interpolated sample values.

6. The read channel apparatus of claim 5, wherein a data sequence composed of the DC-removed sample values and the first interpolated sample values is substantially synchronized to the baud rate.

7. The read channel apparatus of claim 5, further comprising a sequence detector for detecting the recorded data from the DC-removed sample values and the first interpolated sample values.

8. The read channel apparatus of claim 7, wherein the sequence detector is a Viterbi sequence detector.

9. The read channel apparatus of claim 5, wherein the sampling device is an analog-to-digital converter.

10. The read channel apparatus of claim 5, further comprises an equalizer for equalizing the DC-removed sample values in accordance with a target spectrum, and outputting to the first interpolator, the timing recovery controller, and the DC offset estimator.

11. The read channel apparatus of claim 10, further comprises:
    N−2 interpolators for interpolating the sample values output from the equalizer respectively to generate N−2 sequences of interpolated sample values, wherein N is an integer; and
    wherein a data sequence composed of the N−2 sequences, the sequence output from the equalizer, and the sequence of the first interpolated sample values is substantially synchronized to the baud rate, and is output to the timing recovery controller and the DC offset estimator, for synchronizing the sampling clock with the data recorded on the optical storage system and generating the estimated DC offset respectively.

12. The read channel apparatus of claim 11, wherein the sampling clock has a sampling rate substantially equaling to 1/N the baud rate.

13. The read channel apparatus of claim 5, further comprises:
    a first equalizer for equalizing the first interpolated sample values in accordance with a target spectrum, and outputting to the timing recovery controller and the DC offset estimator; and
    a second equalizer for equalizing the DC-removed sample values in accordance with the target spectrum, and outputting to the timing recovery controller and the DC offset estimator.

14. The read channel apparatus of claim 13, further comprises:
    N−2 interpolators, each interpolator interpolating the DC-removed sample values to generate a corresponding sequence of interpolated sample values, wherein N is an integer; and
    N−2 equalizers, each equalizer coupled to one interpolator for equalizing the interpolated sample values in accordance with the target spectrum;
    wherein a data sequence composed of the sequences output from the first equalizer, second equalizer, and N−2 equalizers is substantially synchronized to the baud rate, and is output to the timing recovery controller and the DC offset estimator, for synchronizing the sampling clock with the data recorded on the optical storage system and generating the estimated DC offset respectively.

15. The read channel apparatus of claim 14, wherein the sampling clock has a sampling rate substantially equaling to 1/N the baud rate.

16. A read channel apparatus for reading data recorded on an optical storage system at a predetermined baud rate, comprising:
   a sampling device for sampling an analog read signal generating from the optical storage system according to a sampling clock to generate a sequence of sample values;
   N equalizers for equalizing the sample values in accordance with a target spectrum to generate N sequences of equalized sample values, wherein N is an integer;
   a timing recovery controller, responsive to the N sequences of equalized sample values, for controlling the sampling clock in order to synchronize in phase with the data recorded on the optical storage system.

17. The read channel apparatus of claim 16, further comprising a sequence detector for detecting the recorded data from the N sequences of equalized sample values.

18. The read channel apparatus of claim 17, wherein the sequence detector is a Viterbi sequence detector.

19. The read channel apparatus of claim 16, wherein the sampling device is an analog-to-digital converter.

20. The read channel apparatus of claim 16, wherein the sampling clock has a sampling rate substantially equaling to 1/N the baud rate.

21. The read channel apparatus of claim 20, wherein each of the N equalizers interpolates the sample values to generate the corresponding equalized sample values, and a data sequence composed of the N sequences of equalized sample values is substantially synchronized to the baud rate.

22. The read channel apparatus of claim 16, wherein the sampling clock has a sampling rate substantially equaling to the baud rate.

* * * * *